(12) United States Patent
Sasinowski et al.

(10) Patent No.: US 9,360,140 B2
(45) Date of Patent: Jun. 7, 2016

(54) SEALING DEVICE FOR A VEHICLE

(71) Applicant: GM GLOBAL TECHNOLOGY OPERATIONS LLC, Detroit, MI (US)

(72) Inventors: Raymond H. Sasinowski, Brighton, MI (US); Adrian O. Balmaceda, Fair Haven, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 206 days.

(21) Appl. No.: 14/101,716

(22) Filed: Dec. 10, 2013

(65) Prior Publication Data

US 2015/0159788 A1    Jun. 11, 2015

(51) Int. Cl.
*F16L 17/00* (2006.01)
*F16L 19/00* (2006.01)
*F16J 15/10* (2006.01)
*F16L 21/035* (2006.01)

(52) U.S. Cl.
CPC .............. *F16L 19/00* (2013.01); *F16J 15/104* (2013.01); *F16L 21/035* (2013.01)

(58) Field of Classification Search
USPC .......... 285/374, 347, 345, 110; 277/630, 637, 277/616, 609, 619, 602
See application file for complete search history.

(56) References Cited

U.S. PATENT DOCUMENTS

| | | | | |
|---|---|---|---|---|
| 3,580,988 A * | 5/1971 | Orlowski | ............. | H02G 3/0616 16/2.2 |
| 3,913,928 A * | 10/1975 | Yamaguchi | ............... | E03C 1/14 277/604 |
| 4,293,138 A * | 10/1981 | Swantee | ................... | F16L 5/10 277/607 |
| 4,426,095 A * | 1/1984 | Buttner | .................. | F16L 17/025 277/606 |
| 4,565,381 A * | 1/1986 | Joelson | .................. | F16L 17/025 277/615 |
| 4,662,662 A * | 5/1987 | Delhaes | ................... | F16L 21/03 277/616 |
| 5,288,087 A * | 2/1994 | Bertoldo | .................. | H02G 3/06 277/616 |
| 5,380,017 A | 1/1995 | Leeuwenburg et al. | | |
| 5,496,128 A * | 3/1996 | Odill | ........................ | E02D 29/12 277/616 |
| 5,653,452 A * | 8/1997 | Jarvenkyla | .............. | F16L 47/08 277/607 |
| 5,954,345 A * | 9/1999 | Svoboda | ................. | F16H 57/029 16/2.3 |
| 6,260,851 B1 * | 7/2001 | Baron | ..................... | F16L 37/025 277/603 |
| 6,290,240 B1 * | 9/2001 | Knapp | ...................... | F16J 15/34 277/616 |
| 7,407,165 B1 * | 8/2008 | Chisnell | .................. | F16L 21/02 277/603 |
| 7,469,906 B2 * | 12/2008 | Peet | .......................... | F16J 5/061 277/637 |
| 8,262,094 B2 * | 9/2012 | Beele | ........................ | F16L 5/10 277/607 |

FOREIGN PATENT DOCUMENTS

| | | |
|---|---|---|
| DE | 69100388 T2 | 2/1994 |
| DE | 19713329 A1 | 10/1998 |

* cited by examiner

*Primary Examiner* — Aaron Dunwoody
(74) *Attorney, Agent, or Firm* — Quinn Law Group, PLLC

(57) ABSTRACT

A sealing device is insertable into a port having an internal wall. The device includes a seal member and a ring member operatively connected to each other. The seal member includes an inner seal surface defining a seal opening. The ring member includes an inner ring surface defining a ring opening. The seal opening and the ring opening share a common central axis. The seal member defines a first rib extending circumferentially around the seal opening, the first rib being raised a first height relative to the inner seal surface at the seal opening. The first rib is configured to be deformable in response to a compression force from the internal wall of the port when the seal member is inserted into the port. The seal member may define a second rib axially spaced from the first rib.

17 Claims, 2 Drawing Sheets

SEALING DEVICE FOR A VEHICLE

TECHNICAL FIELD

The disclosure relates generally to a sealing device that may be used at a fluid port of a transmission in a vehicle.

BACKGROUND

A vehicle generally includes a transmission having a plurality of torque-transmitting devices. Transmission fluid is used to engage and hold the torque-transmitting devices. Transmission fluid may also be used in cooling circuits for the transmission and other components of the vehicle. Typically, a sealing device is used to establish a sealed connection between the fluid port of the transmission and the cooling lines. These sealing devices generally require multiple sub-components.

SUMMARY

A sealing device is insertable into a port having an internal wall. The device includes a seal member and a ring member operatively connected to each other. The seal member includes an inner seal surface defining a seal opening. The ring member includes an inner ring surface defining a ring opening. The seal opening and the ring opening share a common central axis. The seal member defines a first rib extending circumferentially around the seal opening. The first rib is raised a first height relative to the inner seal surface at the seal opening. The first rib is configured to be deformable in response to a compression force from the internal wall of the port when the seal member is inserted into the port. By providing sealing adhesion to the internal wall of the port, the first rib may eliminate the need for a block fitting that is typically used to apply a compression force (in a direction parallel to the common central axis) to seal a sealing device to a port.

A tube may be inserted within the seal opening of the seal member. The tube includes a hollow cavity configured to transport a fluid from the tube to the port when the seal member is inserted into the port. The sealing device is configured to operatively connect and seal the tube to the port. The sealing device reduces the number of sub-components required to establish a sealed connection between the port and the tube. The sealing device also reduces the mass of the assembly.

The seal member may define a second rib axially spaced from the first rib and extending circumferentially around the outer surface. The second rib may be raised a second height relative to the inner seal surface at the seal opening. The seal member defines a valley between the first and second ribs. The first and second ribs may be raised third and fourth heights relative to a bottom of the valley. The seal member may be composed of an elastomeric material. The ring member may be composed of a metal.

The seal member includes an inwardly-protruding groove extending circumferentially around the seal opening. The ring member is configured to be at least partially inserted into the groove. The seal member includes at least one first lip and at least one first plateau defined on a first edge of the groove. The first lip is adjacent to the first plateau. The seal member includes at least one second lip and at least one second plateau defined on a second edge of the groove. The second lip is adjacent to the second plateau.

The inner ring surface of the ring member defines first and second portions positioned between a middle portion. The middle portion is spaced a first distance from the common central axis. The first portion defines at least one first tooth and at least one first recess spaced second and third distances, respectively, from the common central axis. The first tooth is adjacent to the first recess. The first distance is less than each of the second and third distances and the second distance is less than the third distance.

The first recess of the ring member is configured to contact the first lip of the seal member when the ring member is at least partially inserted into the groove of the seal member. The first tooth of the ring member is configured to contact the first plateau of the seal member when the ring member is at least partially inserted into the groove of the seal member.

The second portion defines at least one second tooth and at least one second recess spaced at the second and third distances, respectively, from the common central axis. The second recess of the ring member is configured to contact the second lip of the seal member when the ring member is at least partially inserted into the groove of the seal member. The second tooth of the ring member is configured to contact the second plateau of the seal member when the ring member is at least partially inserted into the groove of the seal member.

The above features and advantages and other features and advantages of the present invention are readily apparent from the following detailed description of the best modes for carrying out the invention when taken in connection with the accompanying drawings.

DETAILED DESCRIPTION

Figure 1:
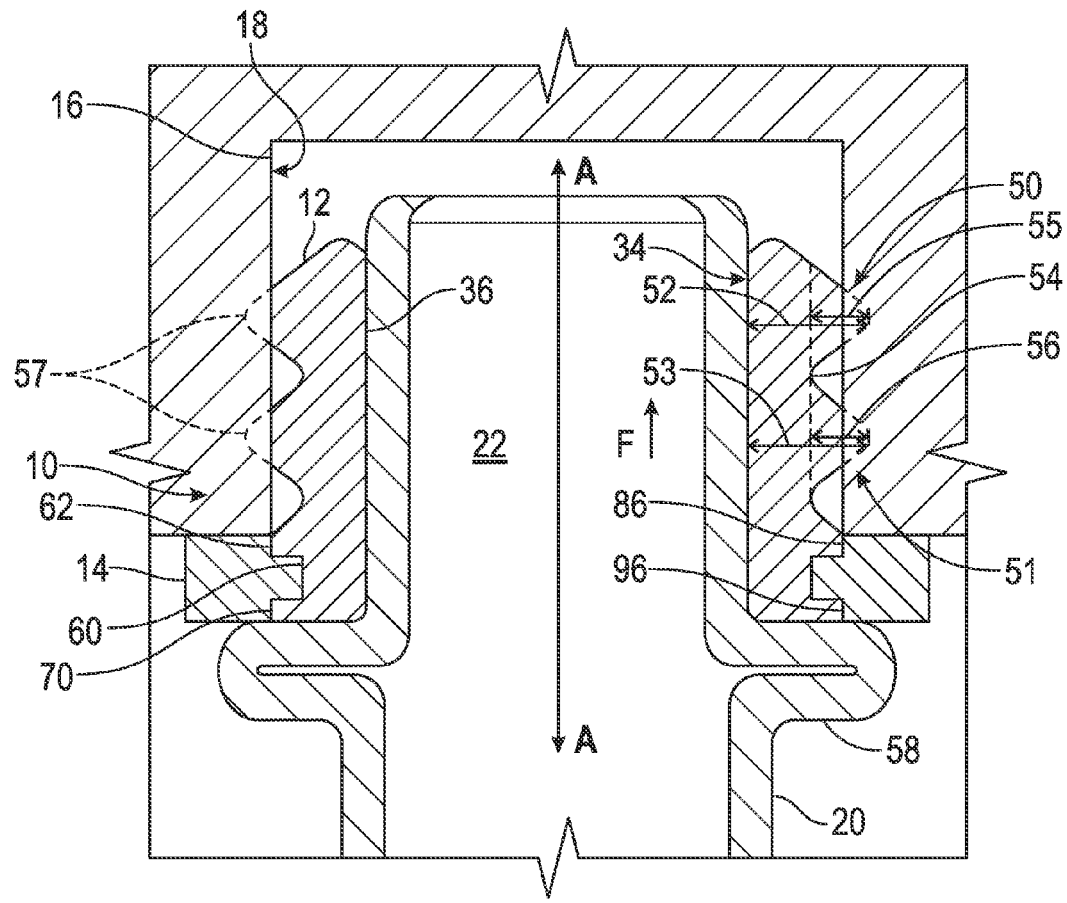
FIG. 1 is a schematic cross-sectional view of a sealing device having a ring member and a seal member.

Referring to the drawings, wherein like reference numbers refer to like components, FIG. 1 is a schematic illustration of a sealing device 10 having a seal member 12 and a ring member 14 operatively connected to each other. The sealing device is insertable in a port 16 having an internal wall 18. Referring to FIG. 1, a tube 20 may be operatively connected to the seal member 12. The tube includes a hollow cavity 22 configured to transport a fluid F to the port when the seal member 12 is inserted into the port 16. The sealing device 10 is configured to sealingly operatively connect the tube 10 to the port 16.

Figure 2:
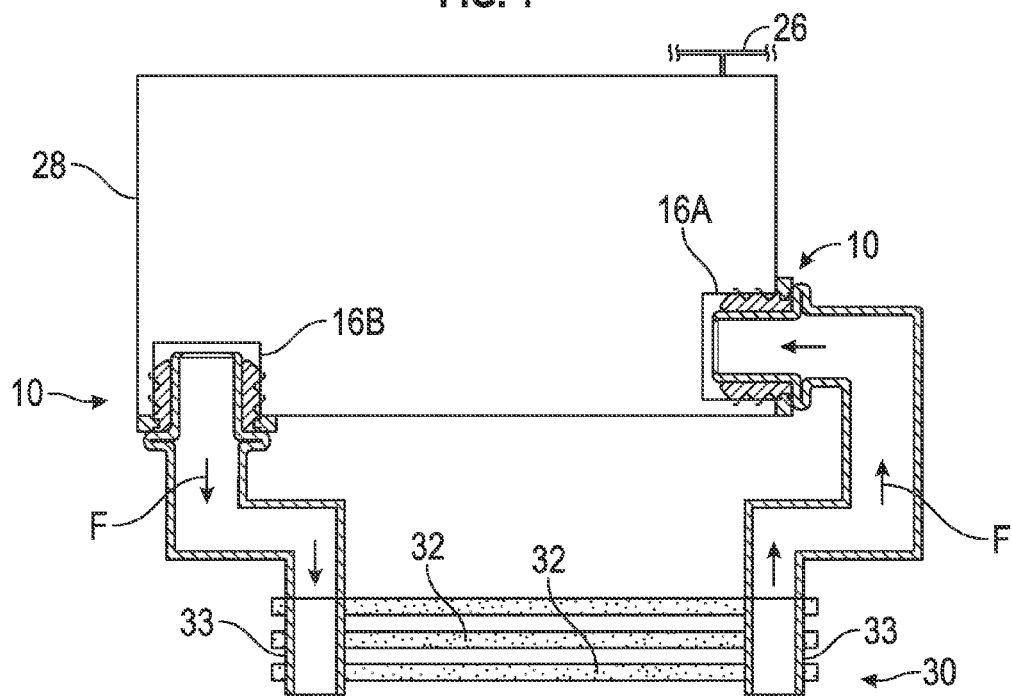
FIG. 2 is a schematic fragmentary partly-sectional illustration of the sealing device of FIG. 1 employed in a vehicle having a transmission.

FIG. 2 is a schematic fragmentary partly-sectional illustration of the sealing device 10 employed in a vehicle 26 having a transmission 28. The transmission 28 typically includes a plurality of torque-transmitting devices (not shown) requiring a fluid such as transmission fluid to engage and hold the torque-transmitting devices. In the example shown in FIG. 2, the sealing device 10 is operatively connected to inlet and outlet ports 16A-B of the transmission 28. Referring to FIG. 2, fluid F exits the transmission 28 through outlet port 16B and enters a cooling circuit 30. The fluid F re-enters the transmission 28 through inlet port 16A. The cooling circuit 30 includes a cooling device configured to cool the fluid F. In one example, the cooling circuit 30 may include a plurality of spaced-apart plates 32 connected to pipes 33. The spaces between the plates 32 provide a cooling flow path. The sealing device 10 may be used in other components of the vehicle 26. The vehicle 26 may take many different forms and include multiple and/or alternate components and facilities.

Figure 3:
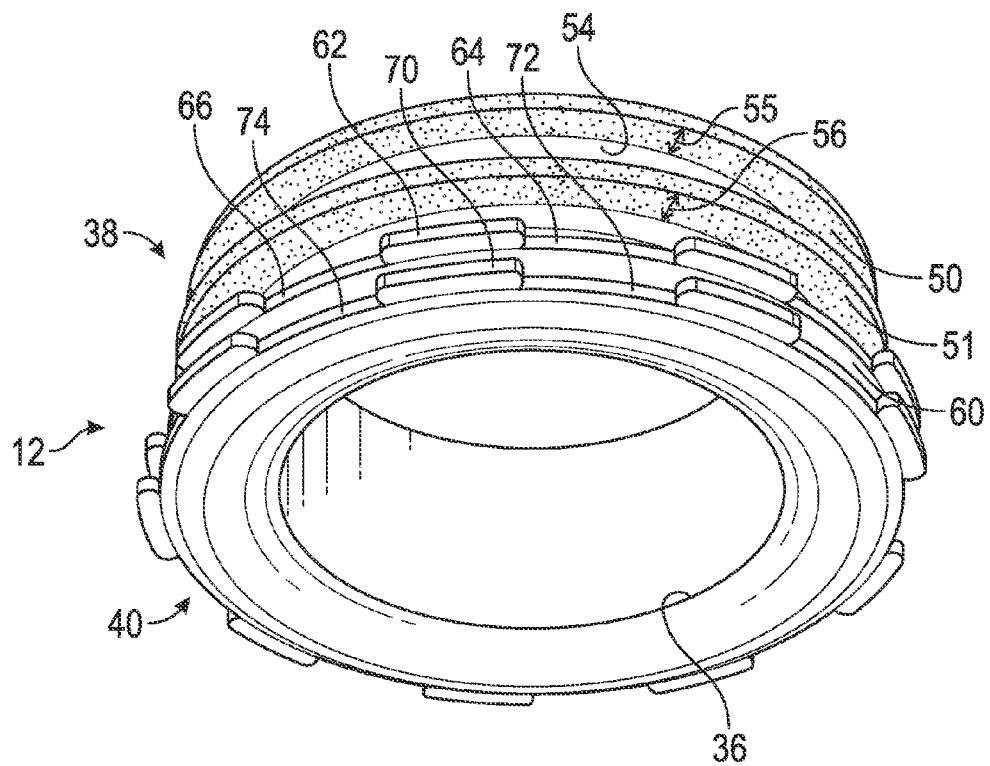
FIG. 3 is a schematic perspective view of the seal member of FIG. 1.
Figure 4:
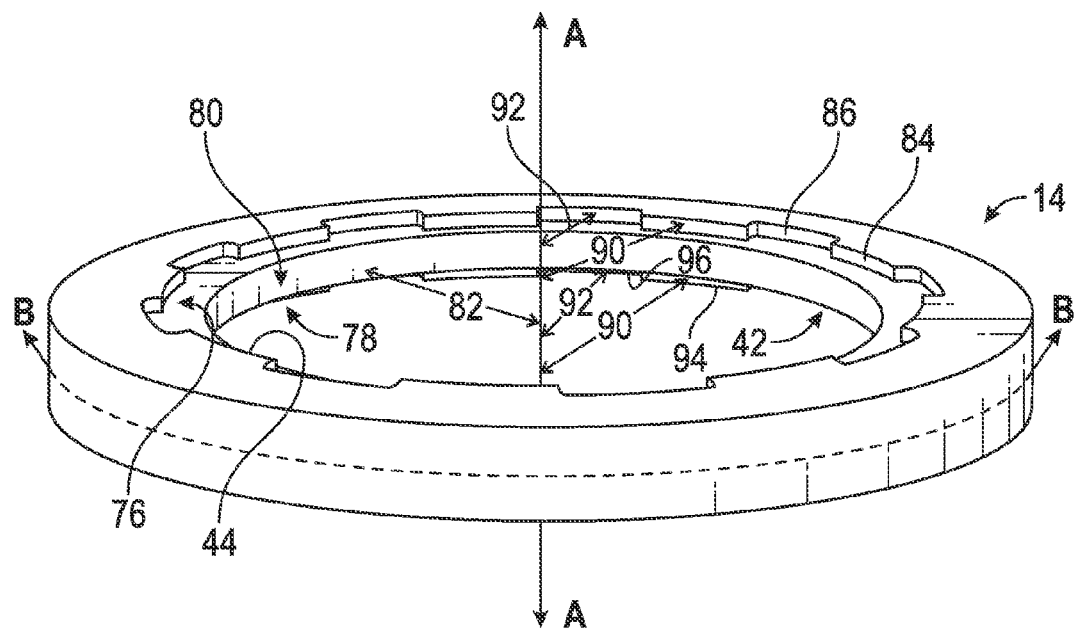
FIG. 4 is a perspective view of the ring member of FIG. 1.

FIG. 3 is a schematic perspective view of the seal member 12. FIG. 4 is a schematic perspective view of the ring member 14. Referring to FIG. 1, the seal member 12 defines an inner seal surface 34 defining a seal opening 36. Referring to FIG. 3, the seal opening 36 extends between first and second ends 38, 40. Referring to FIG. 4, the ring member 14 includes an inner ring surface 42 defining a ring opening 44. Referring to FIGS. 1 and 4, the seal opening 36 and the ring opening 44 share a common central axis A-A.

Referring to FIGS. 1 and 3, the seal member 12 defines a first rib 50 extending circumferentially around the seal opening 36. The first rib 50 is configured to be deformable in response to a compression force from the internal wall of the port 16 when the seal member 12 is inserted into the port 16. A block fitting (not shown) is typically used to apply a compression force in a direction parallel to the common central axis A-A to seal a sealing device to a port. By providing sealing adhesion to the internal wall 18, the first rib 50 may eliminate the need for a block fitting to apply a compression force in a direction parallel to the common central axis A-A.

Referring to FIGS. 1 and 3, the seal member 12 may define a second rib 51 extending circumferentially around the seal opening 36 and axially spaced from the first rib 50, i.e., spaced at a different point along the common central axis A-A. Referring to FIG. 1, the first and second ribs may be raised first and second heights 52, 53 relative to the inner seal surface 34 at the seal opening 36. Referring to FIG. 3, the seal member 12 defines a valley 54 between the first and second ribs 50, 51. Referring to FIGS. 1 and 3, the first and second ribs 50, 51 may be raised third and fourth heights 55, 56 relative to a bottom of the valley 54 (the bottom is indicated by the lead line 54). The first and second heights 52, 53 may be between approximately 5 and 10 mm each. In one example, the third and fourth heights 55, 56 are both approximately 1 mm. In another example, the third and fourth heights 55, 56 are both approximately 2 mm.

The first and second ribs 50, 51 are configured to be compressible when pressed against the internal wall 18 of the port 16. Stated differently, the first and second ribs 50, 51 are configured to extend longer than the internal diameter of the port 16. The dashed lines 57 represent the uncompressed profile of the first and second ribs 50, 51. In one example, a compression of between approximately 60% and 80% is obtained, that is, the respective heights of the first and second ribs 50, 51 are reduced by approximately 60% to 80% when the seal member 12 is inserted into the port 16. The ring member 14 may be press-fitted or molded into the seal member 12 prior to being operatively connected to the port 16. The tube 20 may include projections 58 extending circumferentially around the common central axis A-A. The projections 58 may be configured to retain the ring member 12 and seal member 14 relative to the port 16.

Referring to FIG. 3, the seal member 12 includes an inwardly-protruding groove 60 extending circumferentially around the around the seal opening 36. Referring to FIG. 1, the ring member 14 is configured to be at least partially inserted into the groove 60.

Referring to FIG. 3, the seal member 12 includes at least one first lip 62 and at least one first plateau 64 defined on a first edge 66 of the groove 60. The first lip 62 is adjacent to the first plateau 64. As shown in FIG. 3, multiple first lips 62 and multiple first plateaus 64 may be arranged along the first edge 66 in an alternating pattern (first lip 62, first plateau 64, first lip 62, first plateau 64, etc.). Referring to FIG. 3, the seal member 12 includes at least one second lip 70 and at least one second plateau 72 defined on a second edge 74 of the groove 60. The second lip 70 is adjacent to the second plateau 72. As shown in FIG. 3, multiple second lips 70 and multiple second plateaus 72 may be arranged along the second edge 74 in an alternating pattern (second lip 70, second plateau 72, second lip 70, second plateau 72, etc.).

Referring to FIG. 4, the inner ring surface 42 of the ring member 14 defines first and second portions 76, 78 positioned between a middle portion 80. Referring to FIG. 4, the middle portion 80 is spaced a first distance 82 from the common central axis A-A. Referring to FIG. 4, the first portion 76 defines at least one first tooth 84 and at least one first recess 86 spaced at second and third distances 90, 92, respectively, from the common central axis A-A. The first tooth 84 is adjacent to the first recess 86. The first distance 82 is less than each of the second and third distances 90, 92. The second distance 90 is less than the third distance 92. The first, second and third distances 82, 90, 92 are measured along a plane perpendicular to the common central axis A-A.

Referring to FIG. 1, the first recess 86 (also shown in FIG. 4) of the ring member 14 is configured to contact the first lip 62 (also shown in FIG. 3) of the seal member 12 when the ring member 14 is at least partially inserted into the groove 60 of the seal member 12. The first tooth 84 (shown in FIG. 4) is configured to contact the first plateau 64 (shown in FIG. 3) of the ring member 14 when the ring member 14 is at least partially inserted into the groove 60 of the seal member 12.

Referring to FIG. 4, the ring member 14 may be symmetric along line B-B, that is, the first and second portions 76, 78 may be mirror images of one another. Referring to FIG. 3, the second portion 78 defines at least one second tooth 94 and at least one second recess 96 spaced at the second and third distances 90, 92, respectively, from the common central axis A-A. Referring to FIG. 1, the second recess 96 (also shown in FIG. 4) of the ring member 14 is configured to contact the second lip 70 (also shown in FIG. 3) of the seal member 12 when the ring member 14 is at least partially inserted into the groove 60 of the seal member 12. The second tooth 94 (shown in FIG. 4) is configured to contact the second plateau 72 (shown in FIG. 3) of the ring member 14 when the ring member 14 is at least partially inserted into the groove 60.

The seal member 12 may be composed of any suitable material that is sufficiently compressible and compatible with the transmission fluid temperature and vibrations of the transmission. The seal member 12 may be composed of a non-metal. In one example, the seal member 12 is composed of an elastomeric material such as a synthetic rubber or rubber-like material, including but not limited to, ethylene-propylene terpolymer (EPDM), neoprene (polychloroprene), styrenebutadiene rubber, nitrile rubbers or silicone rubbers. In one embodiment, the seal member 12 is composed of a copolymer of butadiene and acrylonitrile. In one example, the seal member 12 has a melting point above 170 degrees Celsius. The ring member 14 may be composed of a metal.

As is known to those skilled in the art, durometer is one of several measures of the hardness of a material, that is, the material's resistance to permanent indentation. The durometer scale, defined by Albert F. Shore, measures the depth of an indentation in the material created by a given force on a standardized presser foot. This depth is dependent on the hardness of the material, its viscoelastic properties, the shape of the presser foot employed in the test, and the duration of the test. The ASTM D2240 standard recognizes multiple durometer scales using combinations of specific spring forces and indentor configurations. The durometer is a dimensionless quantity. By way of a non-limiting example, the seal member 12 may define a durometer value of between approximately shore 20 A and approximately shore 90 A. By way of a non-limiting example, the seal member 12 may define a durometer value of approximately shore 60 D.

By way of a non-limiting example, the seal member 12 may be formed with a length of approximately 6 to 10 mm and a diameter (widest width) of approximately 10 to 12 mm. The seal member 12 may be formed with any shape, size or configuration suitable for the particular application at hand.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A sealing device insertable into a port having an internal wall, the device comprising:
    a seal member and a ring member operatively connected to each other;
    wherein the seal member has an inner seal surface defining a seal opening;
    wherein the ring member includes an inner ring surface defining a ring opening, the seal opening and the ring opening sharing a common central axis;
    wherein the seal member includes an inwardly-protruding groove extending circumferentially around the seal opening, the ring member being configured to be at least partially inserted into the groove;
    wherein the seal member includes at least one first lip and at least one first plateau defined on a first edge of the groove, the at least one first lip being adjacent to the at least one first plateau;
    wherein the seal member includes at least one second lip and at least one second plateau defined on a second edge of the groove, the at least one second lip being adjacent to the at least one second plateau;
    wherein the seal member defines a first rib extending circumferentially around the seal opening, the first rib being raised a first height relative to the inner seal surface at the seal opening; and
    wherein the first rib is configured to be deformable in response to a compression force from the internal wall of the port when the seal member is inserted into the port.

2. The device of claim 1, wherein the seal member is composed of an elastomeric material.

3. The device of claim 1, wherein the ring member is composed of a metal.

4. The device of claim 1, in combination with a tube configured to be inserted within the seal opening of the seal member, wherein the tube includes a hollow cavity configured to transport a fluid to the port when the seal member is inserted into the port.

5. The device of claim 1, wherein:
    the seal member defines a second rib extending circumferentially around and raised a second height relative to the inner seal surface at the seal opening, the second rib being axially spaced from the first rib; and
    the seal member defines a valley between the first and second ribs, the first and second ribs being raised third and fourth heights relative to a bottom of the valley.

6. The device of claim 5, wherein the third and fourth heights are each between approximately 1 and 2 mm.

7. The device of claim 1, wherein:
    the inner ring surface of the ring member defines first and second portions positioned between a middle portion;
    the middle portion is spaced a first distance from the common central axis;
    the first portion defines at least one first tooth and at least one first recess spaced second and third distances, respectively, from the common central axis, the at least one first tooth being adjacent to the at least one first recess;
    the first distance is less than each of the second and third distances; and
    the second distance is less than the third distance.

8. The device of claim 7, wherein:
    the at least one first recess of the ring member is configured to contact the at least one first lip of the seal member when the ring member is at least partially inserted into the groove of the seal member; and
    the at least one first tooth is configured to contact the at least one first plateau of the seal member when the ring member is at least partially inserted into the groove of the seal member.

9. The device of claim 7, wherein the second portion of the ring member defines at least one second tooth and at least one second recess spaced at the second and third distances, respectively, from the common central axis.

10. The device of claim 9, wherein:
    the at least one second recess of the ring member is configured to contact the at least one second lip of the seal member when the ring member is at least partially inserted into the groove of the seal member; and
    the at least one second tooth is configured to contact the at least one second plateau of the seal member when the ring member is at least partially inserted into the groove of the seal member.

11. A sealing device insertable into a port having an internal wall, the device comprising:
    a seal member and a ring member operatively connected to each other;
    wherein the seal member has an inner seal surface defining a seal opening;
    wherein the ring member includes an inner ring surface defining a ring opening, the seal opening and the ring opening sharing a common central axis;
    wherein the seal member defines first and second ribs extending circumferentially around the seal opening, the second rib being axially spaced from the first rib;
    wherein the seal member defines a valley between the first and second ribs, the first and second ribs being raised third and fourth heights relative to a bottom of the valley;
    wherein the first and second ribs are configured to be deformable in response to a compression force from the internal wall of the port when the seal member is inserted into the port;
    wherein the seal member includes an inwardly-protruding groove extending circumferentially around the outer surface of the seal member, the ring member being configured to be at least partially inserted into the groove;

wherein the seal member includes at least one first lip and at least one first plateau defined on a first edge of the groove, the at least one first lip being adjacent to the at least one first plateau; and wherein the seal member includes at least one second lip and at least one second plateau defined on a second edge of the groove, the at least one second lip being adjacent to the at least one second plateau.

12. A vehicle comprising:

a sealing device including a seal member and a ring member operatively connected to each other;

a port having an internal wall, the sealing device being configured to be insertable into the port;

wherein the seal member has an inner seal surface defining a seal opening;

wherein the ring member includes an inner ring surface defining a ring opening, the seal opening and the ring opening sharing a common central axis;

wherein the seal member includes an inwardly-protruding groove extending circumferentially around the seal opening, the ring member being configured to be at least partially inserted into the groove;

wherein the seal member includes at least one first lip and at least one first plateau defined on a first edge of the groove, the at least one first lip being adjacent to the at least one first plateau;

wherein the seal member includes at least one second lip and at least one second plateau defined on a second edge of the groove, the at least one second lip being adjacent to the at least one second plateau;

wherein the seal member defines a first rib extending circumferentially around the seal opening, the first rib being raised a first height relative to the inner seal surface at the seal opening;

wherein the first rib is configured to be deformable in response to a compression force from the internal wall of the port when the seal member is inserted into the port; and a tube configured to be inserted within the seal opening of the seal member, the tube including a hollow cavity configured to transport a fluid to the port when the seal member is inserted into the port.

13. The vehicle of claim 12, wherein:

the seal member defines a second rib extending circumferentially around and raised a second height relative to the inner seal surface at the seal opening, the second rib being axially spaced from the first rib; and the seal member defines a valley between the first and second ribs, the first and second ribs being raised third and fourth heights relative to a bottom of the valley.

14. The vehicle of claim 12, wherein:

the inner ring surface of the ring member defines first and second portions positioned between a middle portion;

the middle portion is spaced a first distance from the common central axis;

the first portion defines at least one first tooth and at least one first recess spaced second and third distances, respectively, from the common central axis, the at least one first tooth being adjacent to the at least one first recess;

the first distance is less than each of the second and third distances; and the second distance is less than the third distance.

15. The vehicle of claim 14, wherein:

the at least one first recess of the ring member is configured to contact the at least one first lip of the seal member when the ring member is at least partially inserted into the groove of the seal member; and the at least one first tooth is configured to contact the at least one first plateau of the seal member when the ring member is at least partially inserted into the groove of the seal member.

16. The vehicle of claim 12, wherein the second portion of the ring member defines at least one second tooth and at least one second recess spaced at the second and third distances, respectively, from the common central axis.

17. The vehicle of claim 16, wherein:

the at least one second recess of the ring member is configured to contact the at least one second lip of the seal member when the ring member is at least partially inserted into the groove of the seal member; and the at least one second tooth is configured to contact the at least one second plateau of the seal member when the ring member is at least partially inserted into the groove of the seal member.

* * * * *